(12) United States Patent
Sakai et al.

(10) Patent No.: US 9,058,059 B2
(45) Date of Patent: Jun. 16, 2015

(54) GESTURE INPUT DEVICE AND METHOD FOR CONTROLLING GESTURE INPUT DEVICE

(75) Inventors: Shun Sakai, Shiga (JP); Hiroyuki Tanaka, Shiga (JP); Atsushi Irie, Nara (JP); Tatsuya Murakami, Osaka (JP); Takahiro Takayama, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/984,860

(22) PCT Filed: Mar. 18, 2011

(86) PCT No.: PCT/JP2011/056617
§ 371 (c)(1),
(2), (4) Date: Sep. 24, 2013

(87) PCT Pub. No.: WO2012/117570
PCT Pub. Date: Sep. 7, 2012

(65) Prior Publication Data
US 2014/0013417 A1 Jan. 9, 2014

(30) Foreign Application Priority Data
Mar. 3, 2011 (JP) .................. 2011-046680

(51) Int. Cl.
*G11C 7/00* (2006.01)
*G06F 3/01* (2006.01)
(Continued)

(52) U.S. Cl.
CPC .............. *G06F 3/017* (2013.01); *G06F 3/005* (2013.01); *G06F 3/0304* (2013.01); *G06F 21/31* (2013.01); *G06F 3/0425* (2013.01)

(58) Field of Classification Search
CPC ......... G06F 21/31; G06F 3/005; G06F 3/017; G06F 3/0304; G06F 3/012; G06F 3/00; G06F 3/01; G06F 3/033; G06F 3/0481; G06F 3/0346; G06F 3/0416; G06F 3/011; G01S 3/7864; G06K 9/3208; H04N 5/4403; H04N 7/163; H04N 21/4122; H04N 21/4131; H04N 21/42204; H04N 21/4223; H04N 21/44008; H04N 5/23219
USPC ............... 726/2, 4, 16, 17, 21; 348/77, 208.1; 345/173, 156, 158
See application file for complete search history.

(56) References Cited

U.S. PATENT DOCUMENTS

| | | | |
|---|---|---|---|
| 8,269,842 B2 * | 9/2012 | Wang et al. | 348/208.12 |
| 2009/0079813 A1 | 3/2009 | Hildreth | |
| 2010/0050133 A1 | 2/2010 | Nishihara et al. | |

(Continued)

FOREIGN PATENT DOCUMENTS

| | | |
|---|---|---|
| EP | 2244166 A2 | 10/2010 |
| JP | 9-311759 A | 12/1997 |

(Continued)

OTHER PUBLICATIONS

International Search Report in corresponding International Application No. PCT/JP2011/056617 mailed Jun. 28, 2011 (3 pages).
(Continued)

*Primary Examiner* — Thanhnga B Truong
(74) *Attorney, Agent, or Firm* — Osha Liang LLP

(57) ABSTRACT

A gesture input device that controls a control device on the basis of a gesture action of a user has a gesture detecting unit that detects a gesture from an image picked up by a camera, a first gesture determining unit that determines that the gesture detected by the gesture detecting unit includes a first gesture, a second gesture determining unit that determines that the gesture detected by the gesture detecting unit includes a second gesture, and a control signal generating unit that sets a period in which the first gesture determining unit determines that the gesture includes the first gesture as a second gesture valid period in which recognition of the second gesture is valid and generates a control signal on the basis of the second gesture when the second gesture determining unit determines that the gesture includes the second gesture in the second gesture valid period.

20 Claims, 13 Drawing Sheets

(51) Int. Cl.
*G06F 3/00* (2006.01)
*G06F 3/03* (2006.01)
*G06F 21/31* (2013.01)
*G06F 3/042* (2006.01)

(56) References Cited

U.S. PATENT DOCUMENTS

2010/0052851 A1    3/2010  Kaehler
2013/0159939 A1*   6/2013  Krishnamurthi .............. 715/863
2013/0201135 A1*   8/2013  Ludwig ......................... 345/173
2013/0229508 A1*   9/2013  Li et al. ........................... 348/77

FOREIGN PATENT DOCUMENTS

JP    2005-174356 A    6/2005
JP    2007-087089 A    4/2007
JP    2010-009484 A    1/2010
WO    2009-037434 A    2/2009

OTHER PUBLICATIONS

Extended European Search Report issued in corresponding European Application No. 11859664.2, mailed on Mar. 3, 2015 (10 pages).

* cited by examiner

Determination gesture information

| Determination gesture | |
|---|---|
| Left-hand clenched fist |  |
| Left-eye opening/ closing action |  |
| ⋮ | ⋮ |

Operation gesture information

| Operation gesture | |
|---|---|
| State in which only right-hand first finger is held up |  |
| Vertically waving action of left hand |  |
| Horizontally waving action of right hand |  |
| ⋮ | ⋮ |

Control signal table

| Control signal | Operation gesture | |
|---|---|---|
| S01 | State in which only right-hand first finger is held up |  |
| S02 | Vertically waving action of left hand |  |
| S03 | Horizontally waving action of right hand |  |
| ⋮ | ⋮ | ⋮ |

Fig. 6

Process control table

| Control signal | Control content |
| --- | --- |
| S01 | ON/OFF-switching of power supply |
| S02 | Decision command |
| S03 | Cancel command |
| ⋮ | ⋮ |

Operation gesture table

| Operation gesture | | Determination gesture | |
|---|---|---|---|
| State in which only right-hand first finger is held up |  | Left-hand clenched fist |  |
| Vertically waving action of left hand |  | Left-hand clenched fist |  |
| Horizontally waving action of right hand |  | Left-eye opening/ closing action |  |
| ⋮ | ⋮ | ⋮ | ⋮ |

Machine selecting table

| Determination gesture | | Control target machine |
|---|---|---|
| Left-hand clenched fist |  | Television set |
| Left-eye opening/ closing action |  | Air conditioner |
| State in which only right-hand first and middle fingers are held up |  | PC |
| ⋮ | ⋮ | ⋮ |

Fig. 12

Individual specifying table

| User name | Face information |
|---|---|
| Ms. or Mr. A | A1234 |
| Ms. or Mr. B | B2345 |
| Ms. or Mr. C | C3456 |
| ⋮ | ⋮ |

Individually classified determination gesture information

| Determination gesture | | User name |
|---|---|---|
| Left-hand clenched fist |  | Ms. or Mr. A |
| Left-eye opening/ closing action |  | Ms. or Mr. B |
| State in which only right-hand first and middle fingers are held up |  | Ms. or Mr. C |
| ⋮ | ⋮ | ⋮ |

GESTURE INPUT DEVICE AND METHOD FOR CONTROLLING GESTURE INPUT DEVICE

BACKGROUND

1. Technical Field

The present invention relates to a gesture input device that recognizes a gesture of a user to generate a control signal for controlling a device and a method of controlling the gesture input device.

2. Related Art

In recent years, an information input device with a gesture of a user by using a camera is expected as a next-generation interface. Desirably this information input device can recognize a gesture of a user with accuracy. Thus, a conventional technique to recognize a gesture of a user with high accuracy is developed.

For example, Patent Document 1 describes a gesture recognition apparatus that recognizes the start of a gesture by turning on a penlight held by the user and recognizes the end of the gesture by turning off the penlight, wherein a type of the gesture is recognized on the basis of a moving state of the penlight from the start to the end.

Patent Document 2 describes a gesture recognition apparatus that recognizes continuous gestures with high accuracy by using a hidden Markov model for periodical hand gesture recognition even though a user does not present the start and end of the gesture as in the technique described in Patent Document 1.

Furthermore, Patent Document 3 describes a control device operation gesture recognition apparatus that execute an operation depending on an operation gesture to a control device to be operated when a gesture and a sight line of a user are detected from a image of the user imaged with a camera, the detected gesture is a selected gesture, and the sight line of the user faces a control device selected by the selected gesture, when the control device is selected as an object to be operated and the detected gesture is an operation gesture.

Patent Document 1: Japanese Unexamined Patent Publication "Japanese Unexamined Patent Publication No. 9-311759 (publication date: Dec. 2, 1997)"

Patent Document 2: Japanese Unexamined Patent Publication "Japanese Unexamined Patent Publication No. 2007-87089 (publication date: Apr. 5, 2007)"

Patent Document 3: Japanese Unexamined Patent Publication "Japanese Unexamined Patent Publication No. 2009-37434 (publication date: Feb. 19, 2009)"

SUMMARY

An input device with a gesture can advantageously control a machine even though a user does not have or use an input device such as a remote controller or a keyboard. However, in the technique described in Patent Document 1, in order to recognize timings of the start and end of a gesture, a predetermined thing such as a penlight is used. For this reason, the advantage of the input device with a gesture cannot be obtained, and the gesture recognition apparatus described in Patent Document 1 is inconvenient to a user.

In the technique described in Patent Document 2, although a thing to recognize a gesture is not required, an action unintended by a user is also recognized as a gesture to operate a control subject device. For this reason, the control subject device may erroneously operate.

The technique described in Patent Document 3, when a predetermined gesture is recognized and the face of a user faces a control device, may select the control device as a control subject device or executes control based on a gesture. Patent Document 3 describes that a gesture performed while a user faces a control device to be operated is probably a gesture intended by the user.

However, it is naturally considered that a user watches (monitors) a control device when the control device is being operated. It can be sufficiently considered that, even though the sight line of the user points at the control device, the user unintentionally perform a gesture to operate the control the control device.

For example, when a control device is a television set, the face of a user often faces the television set while the television set operates. It is difficult to accurately determine, by detecting a sight line direction of the user, whether a gesture is intended by the user.

One or more embodiments of the present invention provides a gesture input device that prevents an action unintended by a user from being erroneously recognized as a valid gesture and a method of controlling the gesture input device.

A gesture input device according to one or more embodiments of the present invention that controls a control device on the basis of a gesture action of a user, includes: a gesture detecting means that detects a gesture from an image picked up by a camera, a first gesture determining means that determines that the gesture detected by the gesture detecting means includes a first gesture, a second gesture determining means that determines that the gesture detected by the gesture detecting means includes a second gesture, a control signal generating means that sets a period in which the first gesture determining means determines that the gesture includes the first gesture as a second gesture valid period in which recognition of the second gesture is valid and generates a control signal on the basis of the second gesture when the second gesture determining means determines that the gesture includes the second gesture in the second gesture valid period, and a transmitting means that transmits the control signal generated by the control signal generating means to the control device.

A method of controlling a gesture input device according to one or more embodiments of the present invention that controls a control device on the basis of a gesture action of a user, includes: a gesture detecting step of detecting a gesture from an image picked up by a camera, a first gesture determining step of determining that the gesture detected in the gesture detecting step includes a first gesture, a second gesture determining step of determining that the gesture detected in the gesture detecting step includes a second gesture, a control signal generating step of setting a period in which it is determined in the first gesture determining step that the gesture includes the first gesture as a second gesture valid period in which recognition of the second gesture is valid and generates a control signal on the basis of the second gesture when it is determined in the second gesture determining step that the gesture includes the second gesture in the second gesture valid period, and a transmitting step of transmitting the control signal to the control device.

According to the configuration, the control signal generating means sets, as a valid gesture to generate the control signal, the second gesture determined by the second gesture determining means to be included in the gesture detected by the gesture detecting means in the second gesture valid period. The control signal generating means generates a control signal corresponding to a second gesture determined by the second gesture determining means to be included in the gesture in the second gesture valid period, and the transmitting means transmits the control signal to the control device.

In other words, when a second gesture is not determined by the second gesture determining means in the second gesture valid period, even though the second gesture is determined by the second gesture determining means to be included in the gesture, the control signal generating means does not generate the control signal on the basis of the second gesture.

For this reason, even though a user unintentionally performs a second gesture, when the user does not perform a first gesture simultaneously with the second gesture, the control signal generating means does not generate a control signal on the basis of the second gesture. Thus, the gesture input device performs a process of making only a second gesture in a period in which the first gesture is recognized valid to make it possible to prevent an erroneous operation caused by a second gesture unintended by a user.

As described above, a gesture input device according to one or more embodiments of the present invention includes a gesture detecting means that detects a gesture from an image picked up by a camera, a first gesture determining means that determines that the gesture detected by the gesture detecting means includes a first gesture, a second gesture determining means that determines that the gesture detected by the gesture detecting means includes a second gesture, a control signal generating means that sets a period in which the first gesture determining means determines that the gesture includes the first gesture as a second gesture valid period in which recognition of the second gesture is valid and generates a control signal on the basis of the second gesture when the second gesture determining means determines that the gesture includes the second gesture in the second gesture valid period, and a transmitting means that transmits the control signal generated by the control signal generating means to the control device.

A method of controlling a gesture input device according to one or more embodiments of the present invention includes: a gesture detecting step of detecting a gesture from an image picked up by a camera, a first gesture determining step of determining that the gesture detected in the gesture detecting step includes a first gesture, a second gesture determining step of determining that the gesture detected in the gesture detecting step includes a second gesture, a control signal generating step of setting a period in which it is determined in the first gesture determining step that the gesture includes the first gesture as a second gesture valid period in which recognition of the second gesture is valid and generates a control signal on the basis of the second gesture when it is determined in the second gesture determining step that the gesture includes the second gesture in the second gesture valid period, and a transmitting step of transmitting the control signal to the control device.

Thus, the gesture input device, by a simple process of making only a second gesture in a period in which the first gesture is recognized valid, can prevent an erroneous operation caused by a second gesture unintended by a user.

Other objects, characteristic features, and merits of the present invention will be sufficiently understood by the following description. Advantages of the present invention will be apparent by the following explanation with reference to the accompanying drawings.

BRIEF DESCRIPTION OF THE DRAWINGS

FIG. 6 is a diagram illustrating an example of a process control table stored in a storage unit of a control subject device serving as a destination to which the gesture input device transmits a control signal.

FIG. 12 is a diagram illustrating an example of an individual specifying table stored in the storage unit included in the gesture input device.

DETAILED DESCRIPTION

Embodiments of the present invention will be described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A first embodiment of the present invention will be described below with reference to FIG. 1 to FIG. 7.

[Configuration of Gesture Input Device]

Figure 1:
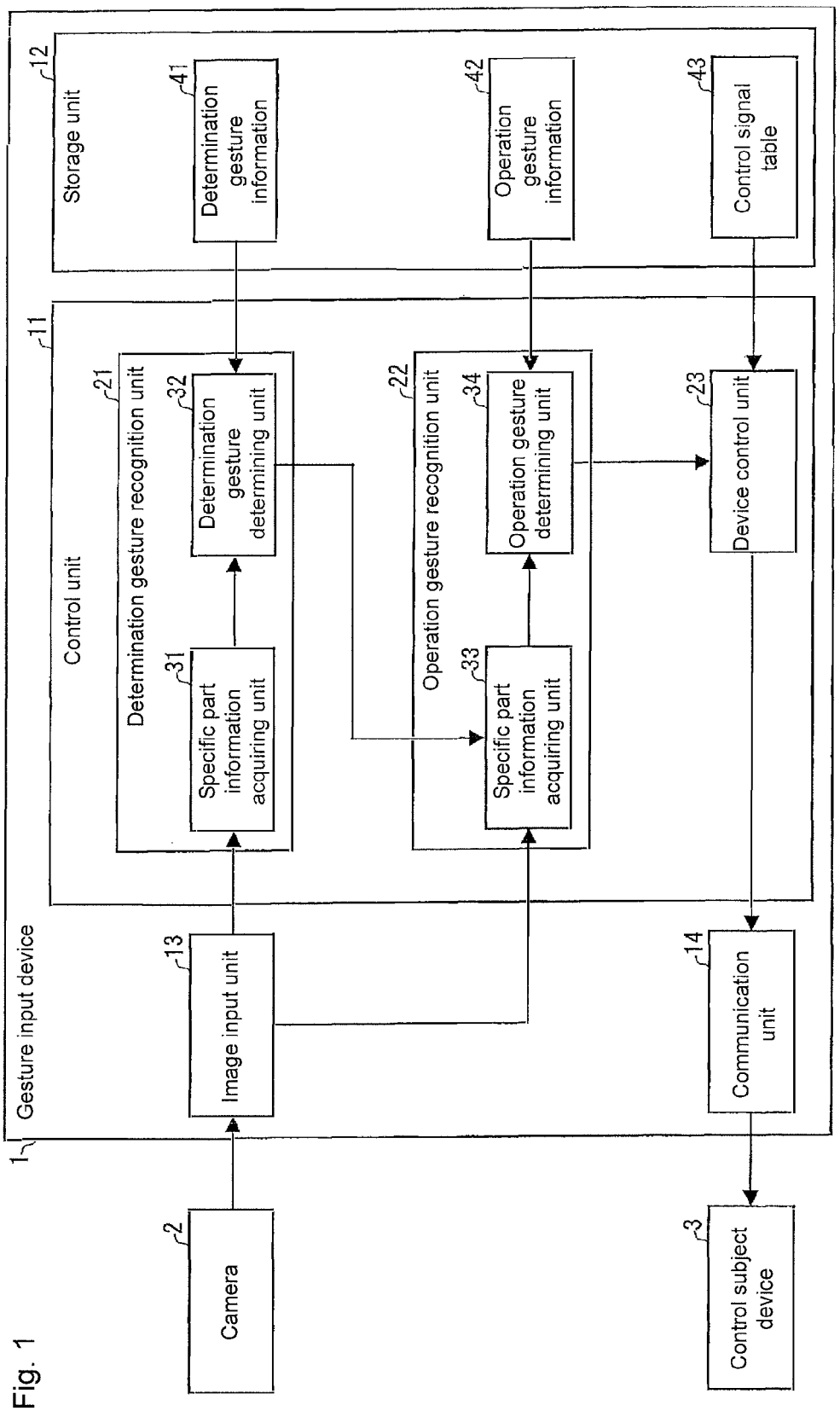
FIG. 1 shows a first embodiment of the present invention, and is a block diagram illustrating an example of a main configuration of a gesture input device.

FIG. 1 is a block diagram illustrating an example of a main configuration of a gesture input device. As illustrated in FIG. 1, a gesture input device 1 includes a control unit 11, a storage unit 12, an image input unit 13, and a communication unit 14. The gesture input device 1 may include members such as a display unit, an operation unit, a voice input unit, and a voice output unit.

The image input unit 13 is to acquire an image picked up by a camera 2. In one or more embodiments of the present invention, the camera 2 is to pick up an image of the entire body or a part of a user, and the image input unit 13 acquires an image including the image of the entire body or a part of the user.

The communication unit 14 communicates with another device such as a control subject device (control device) 3 by using a wireless communication means of a wired communication means to exchange data according to a designation of the control unit 11. More specifically, the communication unit 14 transmits a control signal to the control subject device 3 according to a designation of the control unit 11.

The control subject device 3 includes, for example, home electric appliances such as a television set, an air conditioner, and a personal computer. However, the control subject device 3 is not limited to the home electric appliances, and a device that receives the control signal and executes a process on the basis of the received control signal.

The control unit 11 executes a program read from the storage unit 12 on a temporary storage unit (not illustrated) to perform various arithmetic operations, and totally controls the units included in the gesture input device 1.

In the present embodiment, the control unit 11 includes, as functional blocks, a determination gesture recognition unit 21, an operation gesture recognition unit 22, and device control unit (control signal generating means and transmitting means) 23. The functional blocks (21 to 23) of the control unit 11 can be realized such that a CPU (central processing unit) reads a program stored in a storage device realized by a ROM (read only memory) or the like on a temporary storage unit realized by a RAM (random access memory) and executes the program.

The determination gesture recognition unit 21 acquires an image from the image input unit 13, detects a gesture of a user from the acquired image, and determines whether the detected gesture includes a determination gesture.

In this case, a gesture of a user means a predetermined shape or a predetermined action of the body of the user such as the face (eye, mouth, or the like), a hand, an arm, the trunk, or a leg of the user or a combination thereof. For example, as an example of the gesture, a state in which the tight fist of a left hand (clenched fist) is made, an action in which the palm of a right hand is vertically waved, a state in which a left foot is raised, a direction of a face (sight line direction), an eye opening/closing action (eyewink), a mouth opening action, or the like is known.

The determination gesture (first gesture) includes one predetermined gesture or a plurality of predetermined gestures, and a gesture to make recognition of an operation gesture (will be described later) valid.

The determination gesture recognition unit 21, more specifically, includes a specific part information acquiring unit (gesture detecting means) 31 and a determination gesture assessment unit (first gesture determining means) 32.

The specific part information acquiring unit 31 acquires an image from the image input unit 13, detects one gesture or a plurality of gestures of a user from the acquired image, and generates one piece of or pieces of specific part information representing the detected gestures. The specific part information acquiring unit 31 outputs the generated specific part information to the determination gesture assessment unit 32.

The specific part information, in other words, is information representing a shape or an action of a specific part such as the face (eye, mouth, or the like), a hand, an arm, the trunk, or a leg of a user. More specifically, the specific part information is information representing a predetermined gesture of a user.

The determination gesture assessment unit 32 acquires specific part information from the specific part information acquiring unit 31 and reads determination gesture information 41 representing a determination gesture from the storage unit 12. The determination gesture assessment unit 32 is to determine whether the gesture represented by the acquired specific part information is matched with the determination gesture represented by the read determination gesture information 41.

When the determination gesture assessment unit 32 determines that the gesture represented by the acquired specific part information is matched with the determination gesture represented by the read determination gesture information 41, the determination gesture assessment unit 32 notifies the operation gesture recognition unit 22 of that effect (determination gesture valid notice).

In this case, the determination gesture valid notice includes determination gesture information representing a determination gesture determined as a matched gesture by the determination gesture assessment unit 32.

When the operation gesture recognition unit 22 receives a determination gesture valid notice from the determination gesture assessment unit 32 (determination gesture recognition unit 21), the operation gesture recognition unit 22 acquires an image from the image input unit 13, detects a gesture of a user on the acquired image, and determines whether the detected gesture includes an operation gesture.

In this case, the operation gesture (second gesture) includes one predetermined gesture or a plurality of predetermined gestures, and a gesture to control a control subject device.

The operation gesture recognition unit 22, more specifically, includes a specific part information acquiring unit (gesture detecting means) 33 and an operation gesture assessment unit (second gesture determining means) 34.

When the specific part information acquiring unit 33 receives a determination gesture valid notice from the determination gesture assessment unit 32, the specific part information acquiring unit 33 acquires an image from the image input unit 13. The specific part information acquiring unit 33 acquires one gesture or a plurality of gestures of the user from the acquired image and generates one piece of or pieces of specific part information representing the detected gestures. The specific part information acquiring unit 33 outputs the generated specific part information to the operation gesture assessment unit 34.

The operation gesture assessment unit 34 acquires specific part information from the specific part information acquiring unit 33 and reads operation gesture information 42 representing an operation gesture from the storage unit 12. The operation gesture assessment unit 34 is to determine whether the gesture represented by the acquired specific part information is matched with the operation gesture represented by the read operation gesture information 42.

When the operation gesture assessment unit 34 determines that the gesture represented by the acquired specific part information is matched with the operation gesture represented by the operation gesture information 42, the operation gesture assessment unit 34 notifies the device control unit 23 of that effect (operation gesture valid notice).

In this case, the operation gesture valid notice includes operation gesture information representing an operation gesture determined as a matched gesture by the operation gesture assessment unit 34.

When the device control unit 23 receives an operation gesture valid notice from the operation gesture assessment unit 34 (operation gesture recognition unit 22), the device control unit 23 reads a control signal table 43 from the storage unit 12. The device control unit 23, in the read control signal table 43, generates a control signal associated with an operation gesture represented by operation gesture information included in the received operation gesture valid notice.

The device control unit 23 transmits the generated control signal to the control subject device 3 through the communication unit 14.

The storage unit 12 is to store a program, data, and the like to which the control unit 11 refers, and, for example, stores the determination gesture information 41, the operation gesture information 42, the control signal table 43, and the like therein.

Figure 2:
FIG. 2 is a diagram illustrating an example of determination gesture information stored in a storage unit included in the gesture input device.
Figure 2:
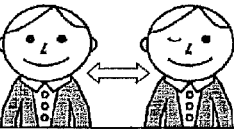
Figure 3:
FIG. 3 is a diagram illustrating an example of operation gesture information stored in the storage unit.
Figure 3:
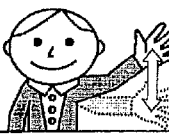
Figure 3:
Figure 4:
FIG. 4 is a diagram illustrating an example of a control signal table stored in the storage unit.
Figure 4:
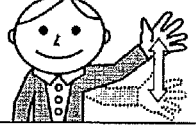
Figure 4:

The determination gesture information 41, the operation gesture information 42, and the control signal table 43 stored in the storage unit 12 will be described below with reference to FIG. 2 to FIG. 4, respectively. FIG. 2 is a diagram illustrating an example of determination gesture information 41 stored in the storage unit 12. FIG. 3 is a diagram illustrating an example of operation gesture information 42 stored in the storage unit 12. FIG. 4 is a diagram illustrating an example of the control signal table 43 stored in the storage unit 12.

In the example illustrated in FIG. 2, in the storage unit 12, the determination gesture information 41 representing a gesture of "left-hand clenched fist" and the determination gesture information 41 representing a gesture of "right-eye opening/closing action" are stored. More specifically, in the example illustrated in FIG. 2, as a determination gesture, the gesture of "left-hand clenched fist" and the gesture of "right-eye opening/closing action" are predetermined.

In the example illustrated in FIG. 3, in the storage unit 12, the operation gesture information 42 representing a gesture of a "state in which only right-hand first finger is held up", the operation gesture information 42 representing a gesture of a "vertically waving action of left hand", and the operation gesture information 42 representing a gesture of a "horizontally waving action of right hand" are stored. More specifically, in the example illustrated in FIG. 3, as operation gestures, a gesture of the "state in which only right-hand first finger is held up", a gesture of the "vertically waving action of left hand", and a gesture of the "horizontally waving action of right hand" are predetermined.

As illustrated in FIG. 4, in the control signal table 43, a control signal and an operation gesture are associated with each other. In the example illustrated in FIG. 4, a control signal "S01" and the gesture of the "state in which only right-hand first finger is held up" are associated with each other, a control signal "S02" and the gesture of the "vertically waving action of left hand" are associated with each other, and a control signal "S03" and the gesture of the "horizontally waving action of right hand" are associated with each other.

When the determination gesture information 41, the operation gesture information 42, and the control signal table 43 illustrated in FIGS. 2 to 4 are stored in the storage unit 12, for example, when the gesture recognition unit 22 recognizes the gesture of the "state in which only right-hand first finger is held up" while the determination gesture recognition unit 21 recognizes at least one of the gesture of the "left-hand clenched fist" and the gesture of the "right-eye opening/closing action", the device control unit 23 transmits the control signal "S01" to the control subject device 3.

In this manner, when the plurality of pieces of determination gesture information 41 are stored in the storage unit 12, a period in which the determination gesture recognition unit 21 recognizes some determination gesture is a period in which recognition of an operation gesture by the operation gesture recognition unit 22 is valid.

In the example illustrated in FIGS. 2 and 3, although the plurality of pieces of determination gesture information 41 and the plurality of pieces of operation gesture information 42 are stored in the storage unit 12, the configuration need not be necessarily used. Since at least one determination gesture and at least one operation gesture need only be predetermined, the storage unit 12 need only store at least one piece of determination gesture information 41 and at least one piece of operation gesture information 42.

[Gesture Recognizing Process]

Figure 5:
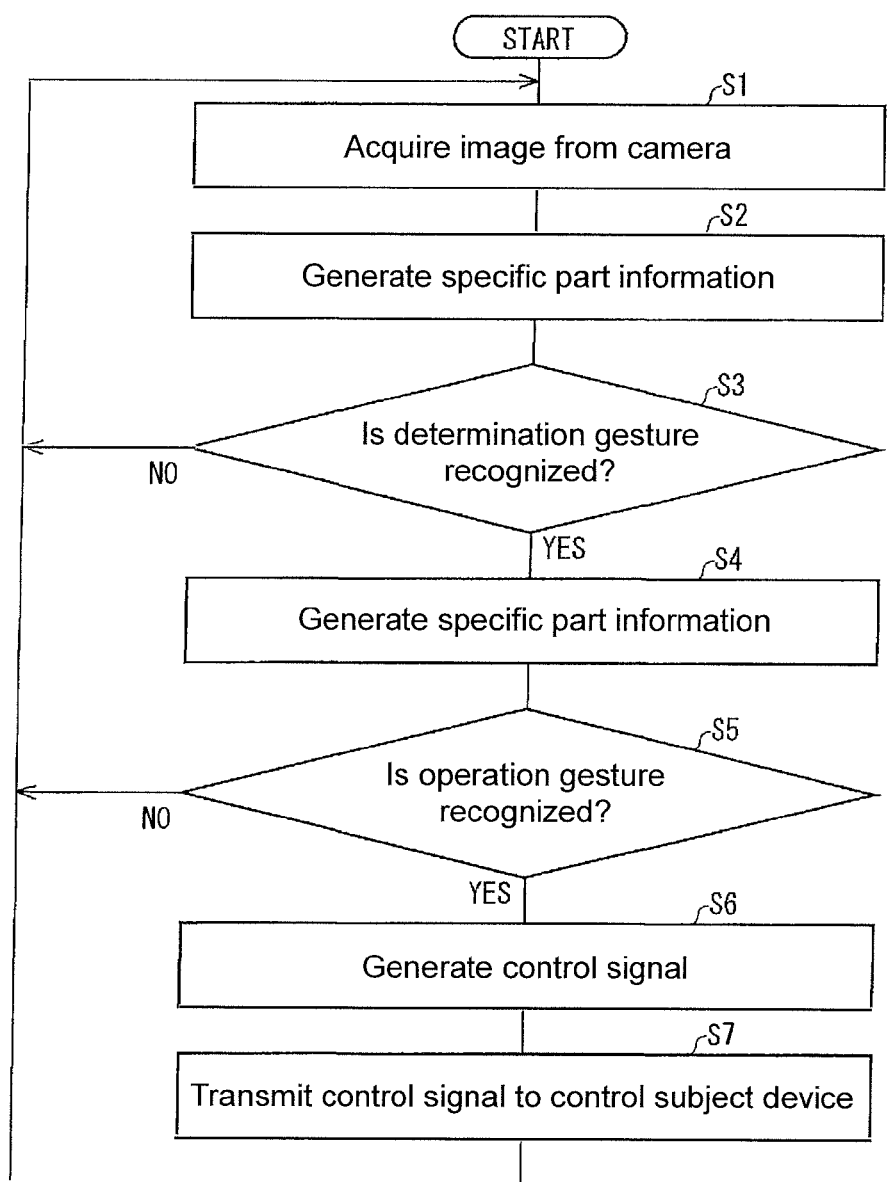
FIG. 5 is a flow chart illustrating an example of a gesture recognizing process in the gesture input device.

A gesture recognizing process in the gesture input device 1 according to the first embodiment will be described below with reference to FIG. 5. FIG. 5 is a flow chart illustrating an example of the gesture recognizing process in the gesture input device 1 according to the first embodiment.

In this case, the gesture recognizing process means a series of processes in which the gesture input device 1 acquires an image from the camera 2, recognizes a determination gesture and an operation gesture from the acquired image, and transmits a control signal based on the recognized operation gesture to a control subject device.

As illustrated in FIG. 5, the image input unit 13 acquires an image picked up by a camera 2 (S1). The specific part information acquiring unit 31 of the determination gesture recognition unit 21 acquires an image from the image input unit 13, detects one gesture or a plurality of gestures of a user from the acquired image, and generates one piece of or pieces of specific part information representing the detected gestures. The specific part information acquiring unit 31 outputs the generated specific part information to the determination gesture assessment unit 32.

The determination gesture assessment unit 32 acquires specific part information from the specific part information acquiring unit 31 and reads determination gesture information 41 representing a determination gesture from the storage unit 12. The determination gesture assessment unit 32 determines whether the gesture represented by the acquired specific part information is matched with the determination gesture represented by the read determination gesture information 41.

In this case, when the determination gesture assessment unit 32 determines that the gestures represented by all the pieces of acquired specific part information are not matched with the determination gesture represented by (any one of) the pieces of read determination gesture information 41 (NO in S3), the control flow returns to S1 to cause the image input unit 13 to acquire the next image picked up by the camera 2. On the other hand, when the determination gesture assessment unit 32 determines that the gesture represented by any one of the pieces of acquired specific part information is matched with the determination gesture represented by (any one of) the pieces of read determination gesture information 41 (YES in S3), the determination gesture assessment unit 32 gives a determination gesture valid notice to the operation gesture recognition unit 22.

When the specific part information acquiring unit 33 of the operation gesture recognition unit 22 receives the determination gesture valid notice, the specific part information acquiring unit 33 acquires an image from the image input unit 13, detects one gesture or a plurality of gestures of a user from the acquired image, and generates one piece of or pieces of specific part information representing the detected gestures (S4). The specific part information acquiring unit 33 outputs the generated specific part information to the operation gesture assessment unit 34.

The operation gesture assessment unit 34 acquires specific part information from the specific part information acquiring unit 33 and reads the operation gesture information 42 representing an operation gesture from the storage unit 12. The operation gesture assessment unit 34 determines whether the gesture represented by the acquired specific part information is matched with the operation gesture represented by the read operation gesture information 42 (S5).

In this case, when the operation gesture assessment unit 34 determines that the gestures represented by all the pieces of acquired specific part information are not matched with the operation gesture represented by (any one of) the pieces of read operation gesture information 42 (NO in S5), the control flow returns to S1 to cause the image input unit 13 to acquire the next image picked up by the camera 2. On the other hand, when the operation gesture assessment unit 34 determines that the gesture represented by any one of the pieces of acquired specific part information is matched with the operation gesture represented by (any one of) the pieces of read operation gesture information 42 (YES in S5), the operation gesture assessment unit 34 gives an operation gesture valid notice including the operation gesture information representing the matched operation gesture to the device control unit 23.

When the device control unit 23 receives an operation gesture valid notice from the operation gesture assessment unit 34, the device control unit 23 reads a control signal table 43 from the storage unit 12. The device control unit 23, in the read control signal table 43, generates a control signal associated with an operation gesture represented by operation gesture information included in the received operation gesture valid notice (S6).

The device control unit 23 transmits the generated control signal to the control subject device 3 through the communication unit 14 (S7). Thereafter, the control flow returns to S1 to cause the image input unit 13 to acquire the next image picked up by the camera 2.

The control subject device 3 that receives the control signal from the device control unit 23 executes a predetermined process on the basis of the received control signal. More specifically, for example, when the control subject device 3 which includes a storage unit (not illustrated) receives a control signal, the control subject device 3 reads a process control table from the storage unit, and, in the read process control table, executes a process associated with the received control signal.

More specifically, for example, when the device control unit 23 transmits the control signal "S01", when a process control table illustrated in FIG. 6 is stored in the storage unit of the control subject device 3, the control subject device 3 executes a process of "ON/OFF-switching of power supply" associated with the control signal "S01" in the process control table illustrated in FIG. 6.

In this manner, the device control unit 23, in a period in which the determination gesture recognition unit 21 (determination gesture assessment unit 32), on the basis of an operation gesture recognized by the operation gesture recognition unit 22 (operation gesture assessment unit 34), generates a control signal. In other words, the device control unit 23, in a period in which the determination gesture recognition unit 21 recognizes a determination gesture, makes the operation gesture recognized by the operation gesture recognition unit 22 valid.

More specifically, when an operation gesture is an operation gesture recognized by the operation gesture recognition unit 22 in the period in which the determination gesture recognition unit 21 recognizes a determination gesture, even though the operation gesture is an operation gesture recognized by the operation gesture recognition unit 22, the device control unit 23 does not generate a control signal on the basis of the operation gesture.

For this reason, even though a user unintentionally performs an operation gesture, when the user does not perform determination gestures at the same time, the device control unit 23 does not generate a control signal on the basis of the operation gesture. Thus, the gesture input device 1 performs a simple process in which only an operation gesture performed in a period in which a determination gesture is recognized is made valid to prevent an action (operation gesture) unintended by a user from being erroneously recognized as a valid gesture.

[Modification 1]

In the present embodiment, as illustrated in FIG. 1, the gesture input device 1, the camera 2, and the control subject device 3 are separated from each other. However, the configuration need not be necessarily used. For example, the gesture input device 1 may be integrated with the camera 2 or the control subject device 3 or may be integrated with the camera 2 and the control subject device 3.

[Modification 2]

In the present embodiment, although the operation gesture information 42 is stored in the storage unit 12, an operation gesture table may be stored in place of the operation gesture information 42. The operation gesture table is obtained by associating an operation gesture and a determination gesture with each other.

In this case, the operation gesture assessment unit 34 acquires specific part information from the specific part information acquiring unit 33, reads the operation gesture table in which the operation gesture and the determination gesture are associated with each other from the storage unit 12, and receives a determination gesture valid notice from the determination gesture assessment unit 32. The operation gesture assessment unit 34 determines whether the gesture represented by the acquired specific part information is matched with an operation gesture associated with a determination gesture represented by determination gesture information included in the determination gesture valid notice in the read operation gesture table.

When the operation gesture assessment unit 34 determines that the gesture represented by the acquired specific part information is matched with the operation gesture associated with the determination gesture represented by the determination gesture information included in the determination gesture valid notice in the read operation gesture table, the operation gesture assessment unit 34 notifies the device control unit 23 of the effect (operation gesture valid notice).

Figure 7:
FIG. 7 is a diagram illustrating an example of an operation gesture table stored in the storage unit included in the gesture input device.
Figure 7:
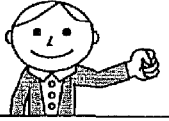
Figure 7:
Figure 7:
Figure 7:
Figure 7:
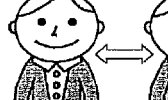

For example, it is assumed that an operation gesture table illustrated in FIG. 7 is stored in the storage unit 12. At this time, when the determination gesture assessment unit 32 recognizes a determination gesture of the "left-hand clenched fist", the operation gesture assessment unit 34 gives, when the gesture represented by the acquired specific part information is a gesture of the "state in which only right-hand first finger is held up" associated with the determination gesture of the "left-hand clenched fist" or a gesture of the "vertically waving action of left hand", an operation gesture valid notice including operation gesture information representing the matched operation gesture to the device control unit 23.

When the determination gesture assessment unit 32 recognizes the determination gesture of the "left-hand clenched fist", even though the gesture represented by the specific part information acquired by the operation gesture assessment unit 34 is a gesture of the "horizontally waving action of right hand", the operation gesture assessment unit 34 determines that the gesture is not matched with the operation gesture.

In the operation gesture table, as illustrated in FIG. 7, the operation gestures and the determination gestures are associated with each other in a one-to-one relationship or a one-to-many relationship. Although not shown, the operation gestures and the determination gestures may be associated with each other in a many-to-one relationship or a many-to-many relationship.

[Modification 3]

In the present embodiment, when the determination gesture recognition unit 21 recognizes a determination gesture, the operation gesture recognition unit 22 executes an operation gesture recognizing process. However, the configuration need not be necessarily performed. For example, a determination gesture recognizing process of the determination gesture recognition unit 21 and an operation gesture recognizing process of the operation gesture recognition unit 22 may be executed in parallel to each other.

In this case, the determination gesture recognition unit 21 and the operation gesture recognition unit 22 acquire images from the image input unit 13, respectively, detect gestures of a user from the acquired images, respectively, to determine whether the detected gestures include a determination gesture and an operation gesture, respectively. When the determination gesture recognition unit 21 and the operation gesture recognition unit 22 determine that the gestures include the determination gesture and the operation gesture, respectively, a determination gesture valid notice and an operation gesture valid notice that represent the effects are transmitted to the device control unit 23.

When the device control unit 23 receives both the determination gesture valid notice and the operation gesture valid notice, the device control unit 23 generates a control signal on the basis of an operation gesture represented by the received operation gesture valid notice.

In other words, the device control unit 23 sets the period in which the determination gesture recognition unit 21 recognizes a determination gesture as an operation gesture valid period (second gesture valid period) in which recognition of an operation gesture by the operation gesture recognition unit 22 is made valid. The device control unit 23 generates a control signal on the basis of an operation gesture recognized by the operation gesture recognition unit 22 in the operation gesture valid period.

When control signals, operation gestures, and determination gestures are associated with each other in the control signal table, the device control unit 23 may generate a control signal on the basis of a determination gesture represented by the received determination gesture valid notice and an operation gesture represented by the received operation gesture valid notice.

Second Embodiment

A second embodiment of the present invention will be described below with reference to FIG. 8 to FIG. 10.

A gesture input device according to the second embodiment, on the basis of a determination gesture, is to select one of a plurality of control subject devices and to transmit a control signal based on an operation gesture to the selected control subject device. The gesture input device according to the second embodiment is the same as the gesture input device according to the first embodiment in that recognition of an operation gesture is made valid only in a period in which a determination gesture is recognized. In the following description, different characteristics between the gesture input device according to the second embodiment and the gesture input device according to the first embodiment will be mainly described below.

For descriptive convenience, the same reference numerals as in the first embodiment denote members having the same functions as those in the first embodiment, and a description thereof will be omitted. The terms defined in the first embodiment are also used as terms defined in the second embodiment unless otherwise noted.

[Configuration of Gesture Input Device]

Figure 8:
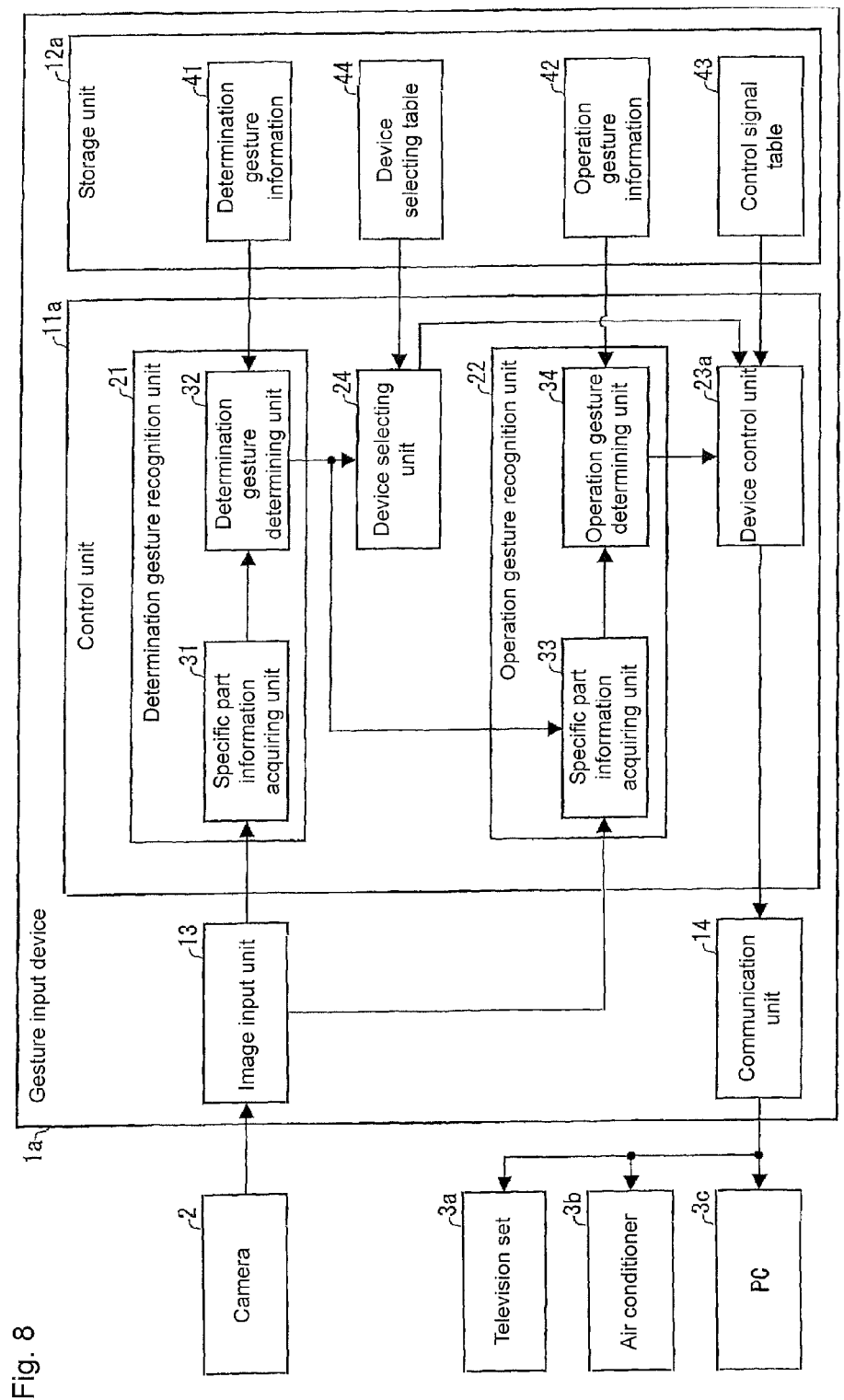
FIG. 8 shows a second embodiment of the present invention, and is a block diagram illustrating an example of a main configuration of a gesture input device.

FIG. 8 is a block diagram illustrating an example of a main configuration of a gesture input device 1a according to the second embodiment. As illustrated in FIG. 8, the gesture input device 1a includes a control unit 11a, a storage unit 12a, the image input unit 13, and the communication unit 14.

In the second embodiment, a plurality of control subject devices 3 to be controlled by the gesture input device 1a are used. In the example illustrated in FIG. 8, as the control subject devices 3, a television set 3a, an air conditioner 3b, and a PC 3c.

The control unit 11a executes a program read from the storage unit 12a on a temporary storage unit (not illustrated) to perform various arithmetic operations, and totally controls the units included in the gesture input device 1a.

In the present embodiment, the control unit 11a includes, as functional blocks, the determination gesture recognition unit 21, the operation gesture recognition unit 22, the device control unit 23a, and a device selecting unit (control device specifying means) 24. The functional blocks (21, 22, 23a, and 24) of the control unit 11a can be realized such that a CPU reads a program stored in a storage device realized by a ROM or the like on a temporary storage unit realized by a RAM or the like and executes the program.

When the device selecting unit 24 receives a determination gesture valid notice from the determination gesture assessment unit 32, the device selecting unit 24 reads a device selecting table 44 from the storage unit 12a. The device selecting unit 24, in the read device selecting table 44, specifies a control subject device associated with a determination gesture represented by determination gesture information included in the received determination gesture valid notification as a control subject device serving as a destination of the control signal.

In this case, a control subject device serving as a destination of a control signal specified by the device selecting unit 24 is called a signal destination device. The device selecting unit 24 transmits signal destination device information representing a specified signal destination device to the device control unit 23a.

When the device control unit 23a receives an operation gesture valid notice from the operation gesture assessment unit 34 (operation gesture recognition unit 22), the device control unit 23a reads a control signal table 43 from the storage unit 12a. The device control unit 23a, in the read control signal table 43, generates a control signal associated with an operation gesture represented by operation gesture information included in the received operation gesture valid notice.

The device control unit 23a receives a signal destination device information from the device selecting unit 24 and transmits the generated control signal to the control subject device 3 represented by the received signal destination device information through the communication unit 14.

The storage unit 12a is to store a program, data, and the like to which the control unit 11a refers, and, for example, stores the determination gesture information 41, the operation gesture information 42, the control signal table 43, the device selecting table 44, and the like therein.

The device selecting table 44 stored in the storage unit 12a will be described with reference to FIG. 9. FIG. 9 is a diagram illustrating an example of the device selecting table 44 stored in the storage unit 12a.

Figure 9:
FIG. 9 is a diagram illustrating an example of a device selecting table stored in a storage unit included in the gesture input device.
Figure 9:
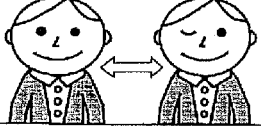
Figure 9:

As illustrated in FIG. 9, the device selecting table 44 is obtained by associating a determination gesture with the control subject device 3. In the example illustrated in FIG. 9, a gesture of "left-hand clenched fist" and a control subject device of "television set" are associated with each other, a gesture of "right-eye opening/closing action" and a control subject device of "air conditioner" are associated with each other, and a gesture of "state in which only left-hand first and middle fingers are held up" and a control subject device of "PC" are associated with each other.

When the device selecting table 44 illustrated in FIG. 9 is stored in the storage unit 12a, for example, when determination gesture recognition unit 21 recognizes a gesture of the "left-hand clenched fist" as a determination gesture, device selecting unit 24 specifies the television set 3a as a signal destination device.

[Gesture Recognizing Process]

A gesture recognizing process in the gesture input device 1a according to the second embodiment will be described below with reference to FIG. 10. FIG. 10 is a flow chart illustrating an example of a gesture recognizing process in the gesture input device 1a according to the second embodiment.

Figure 10:
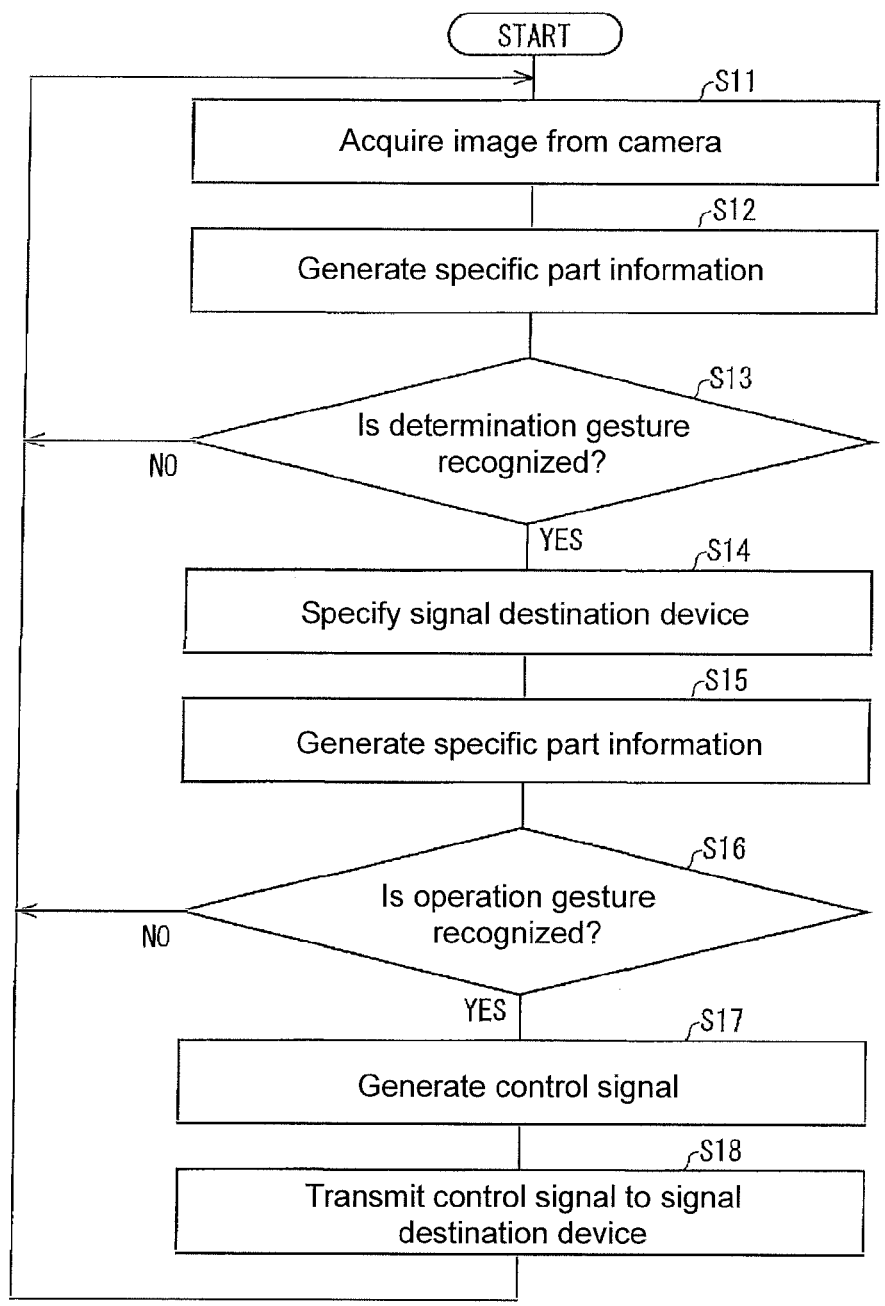
FIG. 10 is a flow chart illustrating an example of a gesture recognizing process in the gesture input device.

The processes in S11 to S13 illustrated in FIG. 10 are the same as the processes in S1 to S3 illustrated in FIG. 5, and a description thereof will be omitted.

In this case, in S13, when the determination gesture assessment unit 32 determines that the gesture represented by any one of the pieces of acquired specific part information is matched with the determination gesture represented by (any one of the pieces of) read determination gesture information 41 (YES in S13), the determination gesture assessment unit 32 gives a determination gesture valid notice to the operation gesture recognition unit 22 and the device selecting unit 24.

When the device selecting unit 24 receives a determination gesture valid notice from the determination gesture assessment unit 32, the device selecting unit 24 reads a device selecting table 44 from the storage unit 12a. The device selecting unit 24, in the read device selecting table 44, specifies a control subject device associated with a determination gesture represented by determination gesture information 40 included in the received determination gesture valid notification as a control subject device (signal destination device) serving as a destination of the control signal (S14).

The device selecting unit 24 transmits signal destination device information representing a specified signal destination device to the device control unit 23a.

When the specific part information acquiring unit 33 of the operation gesture recognition unit 22 receives the determination gesture valid notice, the specific part information acquiring unit 33 acquires an image from the image input unit 13, detects one gesture or a plurality of gestures of a user from the acquired image, and generates one piece of or pieces of specific part information representing the detected gestures (S15). The processes in S15 to S17 illustrated in FIG. 10 are the same as the processes in S4 to S6 illustrated in FIG. 5, and a description thereof will be omitted.

In S17, when the device control unit 23a receives an operation gesture valid notice from the operation gesture assessment unit 34 (operation gesture recognition unit 22), the device control unit 23a reads a control signal table 43 from the storage unit 12a. The device control unit 23a, in the read control signal table 43, generates a control signal associated with an operation gesture represented by operation gesture information included in the received operation gesture valid notice.

The device control unit 23a receives a signal destination device information from the device selecting unit 24 and transmits the generated control signal to the control subject device 3 represented by the received signal destination device information through the communication unit 14 (S18). Thereafter, the control flow returns to S11 to cause the image input unit 13 to acquire the next image picked up by the camera 2.

In this manner, the device selecting unit 24 refers to the device selecting table 44 to specify the control subject device 3 corresponding to a determination gesture recognized by the determination gesture recognition unit 21 (determination gesture assessment unit 32), and the device control unit 23a transmits a generated control signal to the control subject device 3 specified by the device selecting unit 24. More specifically, the device control unit 23a can transmit a control signal only to the control subject device 3 corresponding to a determination gesture recognized by the determination gesture recognition unit 21.

For this reason, a user knows a correspondence between the determination gesture and the control subject device 3 in advance (sets the device selecting table 44) to make it possible to operate only the desired control subject device 3 by using a determination gesture to make an operation gesture valid. Thus, the user can operate only the desired control subject device 3 without performing an excessive operation (for example, another gesture) to select the control subject device 3 to be operated.

[Modification 4]

In the second embodiment, although the device selecting unit 24 selects a control subject device on the basis of a determination gesture, the configuration need not be necessarily used. For example, the device selecting unit 24 may select a control subject device on the basis of an operation gesture. In this case, the device selecting table 44 is obtained by associating a determination gesture with the control subject device.

In place of selection of a control subject device by the device selecting unit 24 on the basis of an operation gesture, a control signal included in the control signal table 43 may represent control contents of each of control subject devices. More specifically, the device control unit 23a may refer to the control signal table 43 to transmit a control signal corresponding to the operation gesture to a control subject device representing or associated with the control signal.

The device selecting unit 24 may select a control subject device on the basis of a selected gesture (third gesture) different from a determination gesture and an operation gesture. In this case, the control unit 11a may include a selected gesture recognition unit (specific part information acquiring unit and a selected gesture determining unit (third gesture determining means)) recognizing a selected gesture, or the determination gesture recognition unit (third gesture determining means) 21 or the operation gesture recognition unit (third gesture determining means) 22 may recognize a selected gesture.

Third Embodiment

A third embodiment of the present invention will be described below with reference to FIG. 11 to FIG. 14.

A gesture input device according to the third embodiment is to authenticate a user and to detect only a gesture of the authenticated user. In the gesture input device according to the third embodiment, a process performed after only a gesture of an authenticated user, i.e., a process related to recognition of a determination gesture and an operation gesture and a process related to generation and transmission of a control signal are the same as the processes in the gesture input device according to the first embodiment. In the following description, different characteristics between the gesture input device according to the third embodiment and the gesture input device according to the first embodiment will be mainly described below.

For descriptive convenience, the same reference numerals as in the first embodiment denote members having the same functions as those in the first embodiment, and a description thereof will be omitted. The terms defined in the first embodiment are also used as terms defined in the third embodiment unless otherwise noted.

[Configuration of Gesture Input Device]

Figure 11:
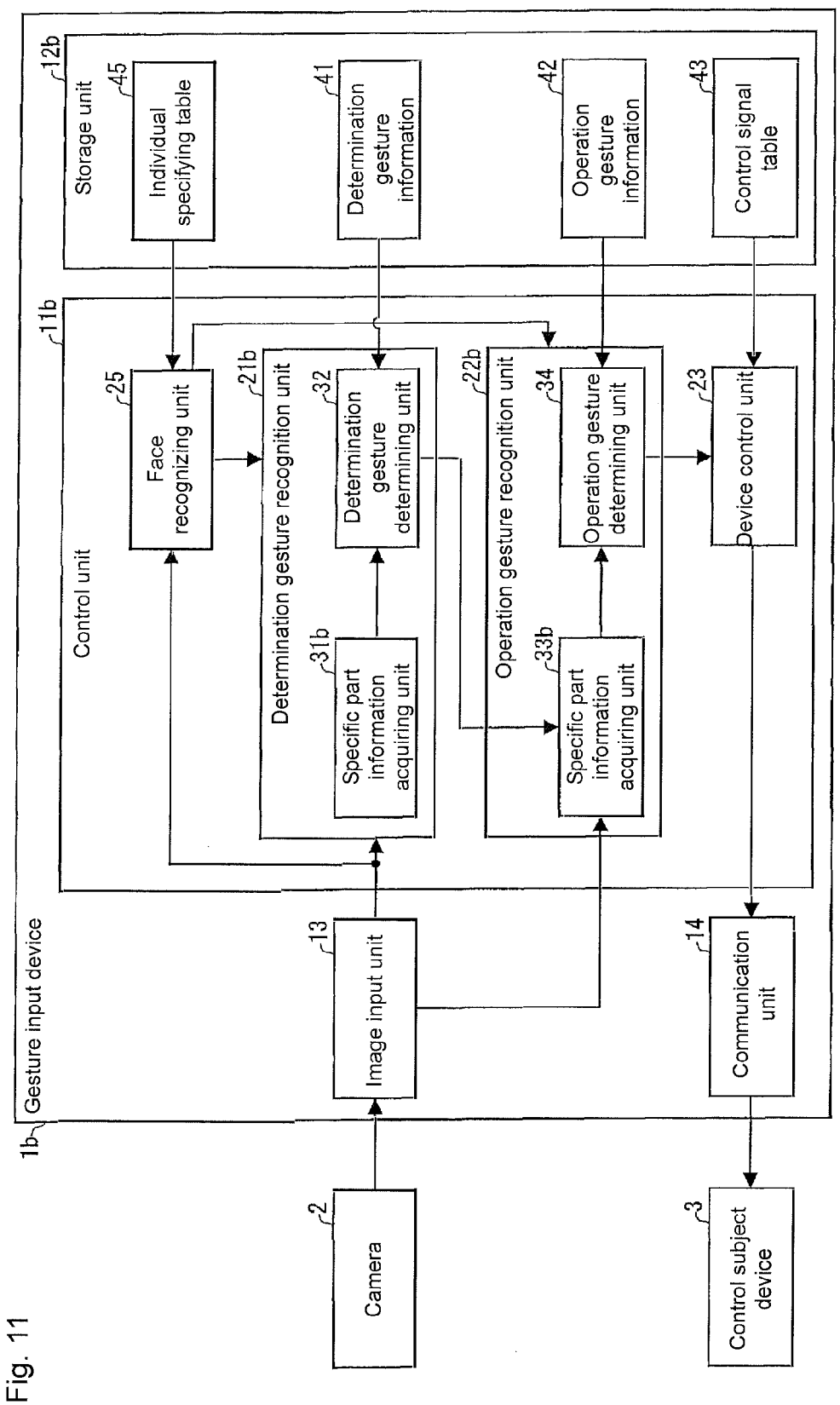
FIG. 11 shows a third embodiment of the present invention, and is a block diagram illustrating an example of a main configuration of a gesture input device.

FIG. 11 is a block diagram illustrating an example of a main configuration of a gesture input device 1b according to the third embodiment. As illustrated in FIG. 11, the gesture input device 1b includes a control unit 11b, a storage unit 12b, the image input unit 13, and the communication unit 14.

The control unit 11b executes a program read from the storage unit 12b on a temporary storage unit (not illustrated) to perform various arithmetic operations, and totally controls the units included in the gesture input device 1b.

In the present embodiment, the control unit 11b includes, as functional blocks, a determination gesture recognition unit 21b, an operation gesture recognition unit 22b, the device control unit 23, and a face recognizing unit (user authentication means) 25. The functional blocks (21b, 22b, 23, and 25) of the control unit 11b can be realized such that a CPU reads a program stored in a storage device realized by a ROM or the like on a temporary storage unit realized by a RAM or the like and executes the program.

The face recognizing unit 25 is to acquire an image from the image input unit 13, detects the face of a person from the acquired image, and determines whether the detected face is matched with the face of a registered user to authenticate the registered user. More specifically, the face recognizing unit 25 acquires an image from the image input unit 13, detects the face of a person from the acquired image, and generates face information representing the detected face. The face recognizing unit 25 reads an individual specifying table from the storage unit 12b and determines whether the generated face information is matched with face information included in the read individual specifying table.

When the face recognizing unit 25 determines that the generated face information is matched with the face information included in the individual specifying table, the face recognizing unit 25 transmits user authentication information including face position information representing a position of the face of the matched face information on the image to the determination gesture recognition unit 21b and the operation gesture recognition unit 22b.

The face information may be image data of the face of a person, or may be data representing an amount of feature extracted from the image data of the face of the person. In accordance with a face authentication process executed by the face recognizing unit 25, face information may be arbitrarily set.

When the determination gesture recognition unit 21b receives user authentication information representing that the registered user is authenticated from the face recognizing unit 25, the determination gesture recognition unit 21b acquires an image from the image input unit 13, detects a gesture of the user authenticated by the face recognizing unit 25 from the acquired image, and determines whether the detected gesture includes a determination gesture. The determination gesture recognition unit 21b, more specifically, includes a specific part information acquiring unit 31b and the determination gesture assessment unit 32.

When the specific part information acquiring unit 31b receives user authentication information from the face recognizing unit 25, the specific part information acquiring unit 31b acquires an image from the image input unit 13. The specific part information acquiring unit 31b, on the basis of a position of an image represented by face position information included in the received user authentication information, specifies a position of the user (user body) authenticated by the face recognizing unit 25 on the acquired image. The specific part information acquiring unit 31b detects one gesture or a plurality of gestures of the user authenticated by the face recognizing unit 25 from a specified positional part of the user in the acquired image and generates one piece of or pieces of specific part information representing the detected gestures. The specific part information acquiring unit 31b outputs the generated specific part information to the determination gesture assessment unit 32.

When the operation gesture recognition unit 22b receives user authentication information representing that the registered user is authenticated from the face recognizing unit 25, and receives a determination gesture valid notice from the determination gesture assessment unit 32 (determination gesture recognition unit 21b), the operation gesture recognition unit 22b acquires an image from the image input unit 13, detects a gesture of the user authenticated by the face recognizing unit 25 from the acquired image, and determines whether the detected gesture includes an operation gesture. The operation gesture recognition unit 22b, more specifically, includes a specific part information acquiring unit 33b and the operation gesture assessment unit 34.

When the specific part information acquiring unit 33b receives user authentication information from the face recognizing unit 25 and receives a determination gesture valid notice from the determination gesture assessment unit 32, the specific part information acquiring unit 33b acquires an image from the image input unit 13. The specific part information acquiring unit 33b, on the basis of a position of an image represented by face position information included in the received user authentication information, specifies a position of the user (user body) authenticated by the face recognizing unit 25 on the acquired image. The specific part information acquiring unit 33b detects one gesture or a plurality of gestures of the user authenticated by the face recognizing unit 25 from a specified positional part of the user in the acquired image and generates one piece of or pieces of specific part information representing the detected gestures. The specific part information acquiring unit 33b outputs the generated specific part information to the operation gesture assessment unit 34.

The storage unit 12b is to store a program, data, and the like to which the control unit 11b refers, and, for example, stores the determination gesture information 41, the operation gesture information 42, the control signal table 43, an individual specifying table 45 and the like therein.

The individual specifying table 45 stored in the storage unit 12b will be described with reference to FIG. 12. FIG. 12 is a diagram illustrating an example of an individual specifying table 45 stored in the storage unit 12b.

As illustrated in FIG. 12, the individual specifying table 45 is obtained by associating user names and piece of face information to authenticate users with each other. In the example illustrated in FIG. 12, a user name "Ms. or Mr. A" and face information "A1234" are associated with each other, a user name "Ms. or Mr. B" and face information "B2345" are associated with each other, and a user name "Ms. or Mr. C" and face information "C3456" are associated with each other.

[Gesture Recognizing Process]

Figure 13:
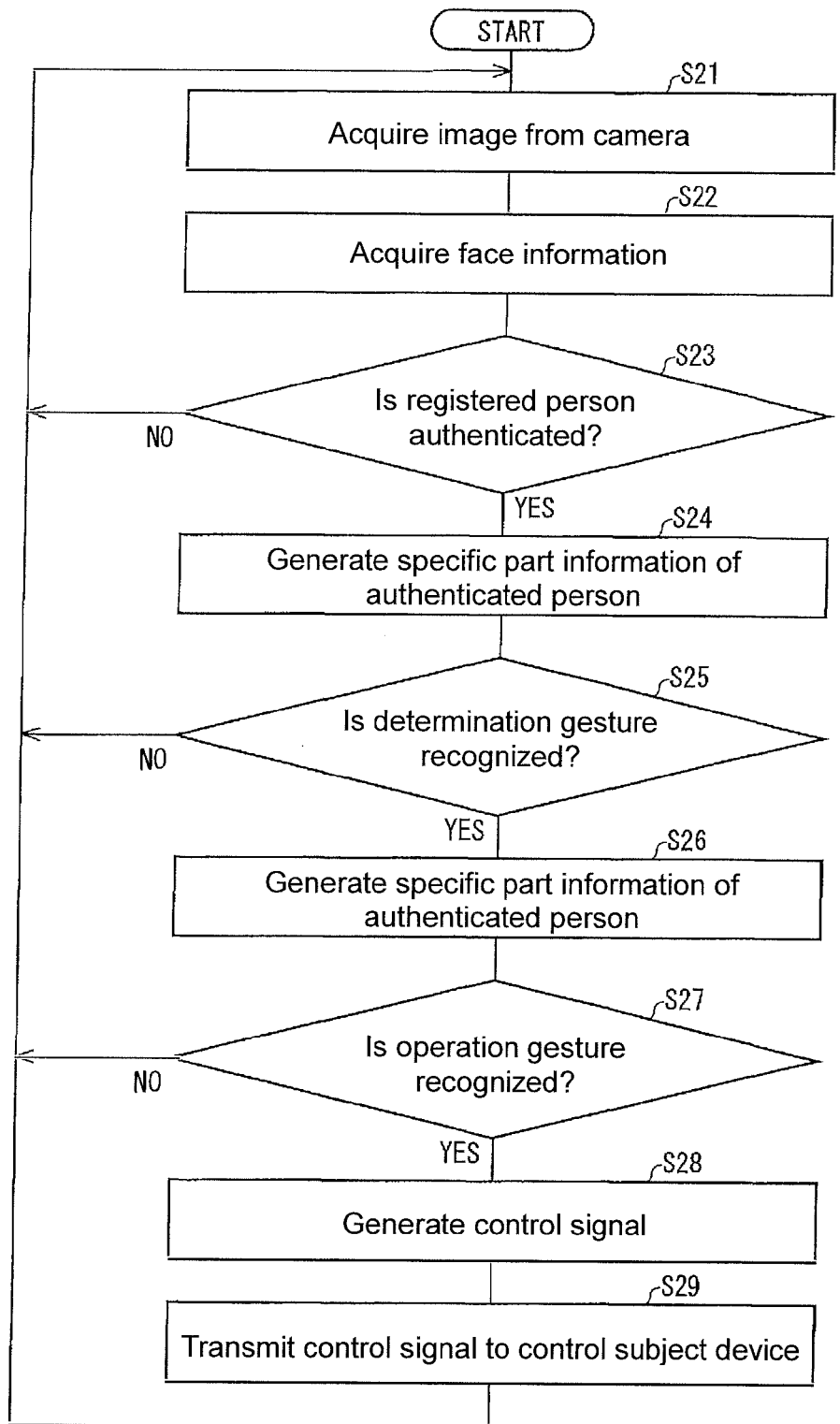
FIG. 13 is a flow chart illustrating an example of a gesture recognizing process in the gesture input device.

A gesture recognizing process in the gesture input device 1b according to the third embodiment will be described below with reference to FIG. 13. FIG. 13 is a flow chart illustrating an example of a gesture recognizing process in the gesture input device 1b according to the third embodiment.

As illustrated in FIG. 13, the image input unit 13 acquires an image picked up by the camera 2 (S21). More specifically, the face recognizing unit 25 acquires an image from the image input unit 13, detects the face of a person from the acquired image, and generates face information representing the detected face (S22). The face recognizing unit 25 reads an individual specifying table from the storage unit 12b and determines whether the generated face information is matched with face information included in the read individual specifying table (S23).

When the face recognizing unit 25 determines that the generated face information is not matched with face information included in the read individual specifying table (NO in S23), the control flow returns to S21 to cause the image input unit 13 to acquire a next image picked up by the camera 2. On the other hand, when the face recognizing unit 25 recognizes that the generated face information is matched with the face information included in the individual specifying table (YES in S23), the face recognizing unit 25 transmits user authentication information including face position information representing a position of the face of the matched face information on the image to the determination gesture recognition unit 21b and the operation gesture recognition unit 22b.

When the specific part information acquiring unit 31b of the determination gesture recognition unit 21b receives user authentication information from the face recognizing unit 25, the specific part information acquiring unit 31b acquires an image from the image input unit 13. The specific part information acquiring unit 31b, on the basis of a position of an image represented by face position information included in the received user authentication information, specifies a position of the user (user body) authenticated by the face recognizing unit 25 on the acquired image. The specific part information acquiring unit 31b detects one gesture or a plurality of gestures of the user authenticated by the face recognizing unit 25 from a specified positional part of the user in the acquired image and generates one piece of or pieces of specific part information representing the detected gestures (S24). The specific part information acquiring unit 31b outputs the generated specific part information to the determination gesture assessment unit 32.

The determination gesture assessment unit 32 acquires specific part information from the specific part information acquiring unit 31b and reads determination gesture information 41 representing a determination gesture from the storage unit 12b. The determination gesture assessment unit 32 determines whether the gesture represented by the acquired specific part information is matched with the determination gesture represented by the read determination gesture information 41 (S25).

In this case, when the determination gesture assessment unit 32 determines that the gestures represented by all the pieces of acquired specific part information are not matched with the determination gesture represented by any one of the pieces of read determination gesture information 41 (NO in S25), the control flow returns to S21 to cause the image input unit 13 to acquire the next image picked up by the camera 2. On the other hand, when the determination gesture assessment unit 32 determines that the gesture represented by any one of the pieces of acquired specific part information is matched with the determination gesture represented by (any one of) the pieces of read determination gesture information 41 (YES in S25), the determination gesture assessment unit 32 gives a determination gesture valid notice to the operation gesture recognition unit 22b.

When the specific part information acquiring unit 33b of the operation gesture recognition unit 22b receives the determination gesture valid notice, the specific part information acquiring unit 33b acquires an image from the image input unit 13. The specific part information acquiring unit 33b, on the basis of a position of an image represented by face position information included in the received user authentication information, specifies a position of the user (user body) authenticated by the face recognizing unit 25 on the acquired image. The specific part information acquiring unit 33b detects one gesture or a plurality of gestures of the user authenticated by the face recognizing unit 25 from a specified positional part of the user in the acquired image and generates one piece of or pieces of specific part information representing the detected gestures (S26). The specific part information acquiring unit 33b outputs the generated specific part information to the operation gesture assessment unit 34.

The operation gesture assessment unit 34 acquires specific part information from the specific part information acquiring unit 33b and reads operation gesture information 42 representing an operation gesture from the storage unit 12b. The operation gesture assessment unit 34 determines whether the gesture represented by the acquired specific part information is matched with the operation gesture represented by the read operation gesture information 42 (S27).

In this case, when the operation gesture assessment unit 34 determines that the gestures represented by all the pieces of acquired specific part information are not matched with the operation gesture represented by (any one of) the pieces of read operation gesture information 42 (NO in S27), the control flow returns to S21 to cause the image input unit 13 to acquire the next image picked up by the camera 2. On the other hand, when the operation gesture assessment unit 34 determines that the gesture represented by any one of the pieces of acquired specific part information is matched with the operation gesture represented by (any one of) the pieces of read operation gesture information 42 (YES in S27), the operation gesture assessment unit 34 gives an operation gesture valid notice including the operation gesture information representing the matched operation gesture to the device control unit 23.

When the device control unit 23 receives an operation gesture valid notice from the operation gesture assessment unit 34, the device control unit 23 reads the control signal table 43 from the storage unit 12b. The device control unit 23, in the read control signal table 43, generates a control signal associated with an operation gesture represented by operation gesture information included in the received operation gesture valid notice (S28).

The device control unit 23 transmits the generated control signal to the control subject device 3 through the communication unit 14 (S29). Thereafter, the control flow returns to S21 to cause the image input unit 13 to acquire the next image picked up by the camera 2.

In this manner, the face recognizing unit 25 authenticates a user on the basis of an image picked up by the camera 2, the specific part information acquiring units 31b and 33b detect a gesture of the user authenticated by the face recognizing unit 25. More specifically, the specific part information acquiring units 31b and 33b detect only a gesture of a user authenticated by the face recognizing unit 25.

For this reason, if an image picked up by the camera 2 includes a gesture of another person or a background image or the like that may be erroneously detected as a gesture, the specific part information acquiring units 31*b* and 33*b* set only a body image of a user authenticated by the face recognizing unit 25 as a gesture detection target region. Thus, a processing load executed by the gesture input device 1*b* (determination gesture recognition unit 21*b* and operation gesture recognition unit 22*b*) can be reduced.

The gesture input device according to the present embodiment can be used in a security system for household purposes or the like. More specifically, a camera is installed on an entrance door of a house, and an operation gesture is used as a key to unlock the entrance door. More specifically, a user is authenticated first, and, thereafter, the user performs a predetermined determination gesture and an operation gesture to make it possible to open the entrance door.

[Modification 5]

In the third embodiment, in the face recognizing unit 25, user authentication information includes face position information. However, in addition to this, user name information representing a user name associated to matched face information in an individual specifying table may be included in the user authentication information. More specifically, the user authentication information may include the face position information and the user name information.

Figure 14:
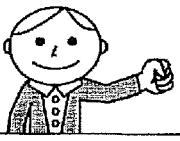
FIG. 14 is a diagram illustrating an example of a determination gesture table stored in the storage unit included in the gesture input device.
Figure 14:
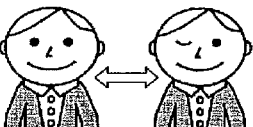
Figure 14:
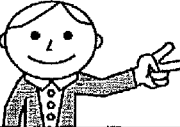

In this case, in place of the determination gesture information 41 stored in the storage unit 12*b*, pieces of individually classified determination gesture information may be stored. The individually classified determination gesture information is obtained by associating determination gestures and user names with each other. The individually classified determination gesture information may be, for example, data as illustrated in FIG. 14.

When the user authentication information includes the face position information and the user name information and when the individually classified determination gesture information is stored in the storage unit 12*b*, the determination gesture assessment unit 32 acquires specific part information representing a gesture of authenticated user from the specific part information acquiring unit 31*b*, reads the individually classified determination gesture information from the storage unit 12*b*, and receives user authentication information from the face recognizing unit 25. The determination gesture assessment unit 32 may determine whether the gesture represented by the authenticated user represented by the acquired specific part information, in the read individually classified determination gesture information, is matched with a determination gesture associated with a user name represented by the user name information included in the received user authentication information.

Not only the association between user names and determination gestures, but also a table in which user names, determination gestures, and operation gestures are associated with each other may be stored in the storage unit 12*b*.

[Modification 6]

In the third embodiment, the face recognizing unit 25, on the basis of an image picked up by the camera 2, authenticates a user. However, the configuration need not be necessarily used. In the present embodiment, a known method of authenticating an individual, for example, authentication using an ID card, fingerprint authentication, vein authentication, or the like can be used. When a user is authenticated on the basis of information except for an image acquired from the camera 2, the specific part information acquiring units 31*b* and 33*b* may specify a position of an authenticated user (user body) on the basis of a position on an image at which a user is present (estimated from a position or the like of an authentication device). The specific part information acquiring units 31*b* and 33*b* may detect a predetermined thing (ID card or the like) from an image acquired from the camera 2 and specify a position of an authenticated user (user body) on the basis of the detected position. A user image table in which users and images (face images or the like) of the users are associated with each other may be stored in the storage unit 12*b* to cause the specific part information acquiring units 31*b* and 33*b* to specify a position of an authenticated user (user body) on an image acquired from the camera 2 on the basis of the user image table read from the storage unit 12*b*.

A gesture input device according to one or more embodiments of the present invention that controls a control device on the basis of a gesture action of a user, includes a gesture detecting means that detects a gesture from an image picked up by a camera, a first gesture determining means that determines that the gesture detected by the gesture detecting means includes a first gesture, a second gesture determining means that determines that the gesture detected by the gesture detecting means includes a second gesture, a control signal generating means that sets a period in which the first gesture determining means determines that the gesture includes the first gesture as a second gesture valid period in which recognition of the second gesture is valid and generates a control signal on the basis of the second gesture when the second gesture determining means determines that the gesture includes the second gesture in the second gesture valid period, and a transmitting means that transmits the control signal generated by the control signal generating means to the control device.

A method of controlling a gesture input device according to one or more embodiments of the present invention that controls a control device on the basis of a gesture action of a user, includes a gesture detecting step of detecting a gesture from an image picked up by a camera, a first gesture determining step of determining that the gesture detected in the gesture detecting step includes a first gesture, a second gesture determining step of determining that the gesture detected in the gesture detecting step includes a second gesture, a control signal generating step of setting a period in which it is determined in the first gesture determining step that the gesture includes the first gesture as a second gesture valid period in which recognition of the second gesture is valid and generates a control signal on the basis of the second gesture when it is determined in the second gesture determining step that the gesture includes the second gesture in the second gesture valid period, and a transmitting step of transmitting the control signal to the control device.

According to the configuration, the control signal generating means sets, as a valid gesture to generate the control signal, the second gesture determined by the second gesture determining means to be included in the gesture detected by the gesture detecting means in the second gesture valid period. The control signal generating means generates a control signal corresponding to a second gesture determined by the second gesture determining means to be included in the gesture in the second gesture valid period, and the transmitting means transmits the control signal to the control device.

In other words, when a second gesture is not determined by the second gesture determining means in the second gesture valid period, even though the second gesture is determined by the second gesture determining means to be included in the gesture, the control signal generating means does not generate the control signal on the basis of the second gesture.

For this reason, even though a user unintentionally performs a second gesture, when the user does not perform a first gesture simultaneously with the second gesture, the control signal generating means does not generate a control signal on the basis of the second gesture. Thus, the gesture input device performs a process of making only a second gesture in a period in which the first gesture is recognized valid to make it possible to prevent an erroneous operation caused by a second gesture unintended by a user.

In the gesture input device according to one or more embodiments of the present invention, the control signal generating means generates, with reference to a control signal table in which the second gesture is associated with a control signal for controlling the control device, the control signal.

According to the configuration, the control signal generating means refers to the control signal table and generates the control signal corresponding to the second gesture determined by the second gesture determining means to be included in the gesture detected by the gesture detecting means in the second gesture valid period. For this reason, different second gestures are associated with control signals regulating various control contents of the control device in advance, respectively, to set the control signal table, so that a user executes a predetermined second gesture to make it possible to cause the control device to perform an operation represented by a control content corresponding to the second gesture.

The gesture input device according to one or more embodiments of the present invention further includes a control device specifying means that specifies the control device corresponding to a first gesture determined by the first gesture determining means to be included in the gesture with reference to a device selecting table in which the first gesture and the control device are associated with each other, and the transmitting means transmits the control signal to the control device specified by the control device specifying means.

According to the above configuration, the control device specifying means specifies the control device corresponding to the first gesture determined by the first gesture determining means to be included in the gesture detected by the gesture detecting means with reference to the device selecting table, the transmitting means transmits a control signal generated by the control signal generating means to the control device specified by the control device specifying means. More specifically, the transmitting means can transmit a control signal only to the control device corresponding to the first gesture determined by the first gesture determining means.

For this reason, a user knows (sets) a correspondence between the first determination gesture and the control device in advance to make it possible to operate only the desired control device by using a first gesture to make the second gesture valid. Thus, the user can operate only the desired control device without performing an excessive operation (for example, another gesture) to select the control device to be operated.

The gesture input device according to one or more embodiments of the present invention further includes a third gesture determining means that determines that the gesture detected by the gesture detecting means includes a third gesture and a control device specifying means that specifies the control device corresponding to the third gesture determined by the third gesture determining means to be included in the gesture with reference to the device selecting table in which the third gesture and the control device are associated with each other, and the transmitting means transmits the control signal to the control device specified by the control device specifying means.

According to the above configuration, the control device specifying means specifies the control device corresponding to the third gesture determined by the third gesture determining means to be included in the gesture detected by the gesture detecting means with reference to the device selecting table, the transmitting means transmits a control signal generated by the control signal generating means to the control device specified by the control device specifying means. More specifically, the transmitting means can transmit a control signal only to the control device corresponding to the third gesture determined by the third gesture determining means.

For this reason, a user knows (sets) a correspondence between the third determination gesture and the control device in advance to make it possible to operate only the desired control device by using a third gesture. Thus, the user selects a desired control device to make it possible to operate only the selected control device.

The gesture input device according to one or more embodiments of the present invention further includes a user authenticating means that authenticates a user, and the gesture detecting means detects a gesture of a user authenticated by the user authenticating means.

According to the configuration, the gesture detecting means detects a gesture of a user authenticated by the user authenticating means. In other words, the gesture detecting means detects a gesture of a user authenticated by the user authenticating means.

For this reason, even if an image picked up by the camera includes a gesture of another person or a background image or the like that may be erroneously detected as a gesture, the gesture detecting means uses only a body image of a user authenticated by the user authenticating means on the image picked up by the camera as a gesture detection target region. Thus, a processing load executed by the gesture input device (the gesture detecting means, the first gesture determining means, and the second gesture determining means) can be reduced.

In the gesture input device according to one or more embodiments of the present invention, the user authenticating means authenticates a user on the basis of an image picked up by the camera.

According to the above configuration, the user authenticating means authenticates a user on the basis of an image picked up by the camera. In other words, the user authenticating means authenticates a user on the basis of an image to recognize a gesture of the user. For this reason, in comparison with another authenticating method that authenticates a user without using an image of a user, the configuration of a device to authenticate a user can be simplified.

The gesture input device may be produced by a computer. In this case, when the computer is operated as means of the gesture input device, a control program to produce the gesture input device with a computer and a computer readable recording medium on which the control program is recorded are also included in the scope of the present invention.

<Complement>

The present invention is not limited to the above embodiments, and various changes and modifications of the invention can be effected within the scope of claims. An embodiment obtained by arbitrarily combining technical means disclosed in the different embodiments is included in the technical scope of the present invention.

Finally, the blocks of the gesture input device 1, especially, the control unit 11 may be configured by a hardware logic or may be produced with software by using a CPU as described below.

More specifically, the gesture input device 1 includes a CPU that executes instructions of a control program that realizes the functions, a ROM in which the program is stored, a RAM that develops the programs, a storage device (recording medium) such as a memory in which the program and various data are stored, and the like. According to one or more embodiments of the present invention, a recording medium on which program codes (executable format program, intermediate code program, and source program) of the control program of the gesture input device 1 serving as software realizing the above functions are computer-readably recorded is supplied to the gesture input device 1, and the computer (or CPU or MPU) reads and executes the program codes recorded on the recording medium.

As the recording medium, for example, a tape-based recording medium such as a magnetic tape or a cassette tape, a disk-based recording medium including a magnetic disk such as a floppy (registered trademark) disk/hard disk, an optical disk such as a CD-ROM/MO/MD/DVD/CD-R, a card-based recording memory such as an IC card (including a memory card)/optical card, a semiconductor-memory-based recording medium such as a mask ROM/EPROM/EEPROM/flash ROM, and the like can be used.

The device may be configured to be able to be connected to a communication network, and the program codes may be supplied through the communication network. The communication network is not limited to a specific communication network. For example, the Internet, an intranet, an extranet, a LAN, an ISDN, a VAN, a CATV communication network, a virtual private network, a telephone network, a mobile communication network, a satellite communication network, and the like can be used. A transmission medium configuring a communication network is not limited to a specific transmission medium. For example, a wired transmission medium such as an IEEE1394, a USB, a power-line carrier, a cable TV network, a telephone line, or an ADSL and a wireless transmission medium such as infrared technology such as IrDA technology or remote control, Bluetooth (registered trademark), 802.11 wireless technology, HDR, a mobile telephone network, a satellite communication network, or a terrestrial digital broadcasting network can be used. One or more embodiments of the present invention can also be realized by the form of a computer data signal embedded in a carrier wave in which the program codes are embodied by electronic transmission.

One or more embodiments of the present invention may be used in an input interface (input device) used to control an electronic device by a user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1, 1a, 1b gesture input device
2 camera
3 control subject device (control device)
3a television set
3b air conditioner
3c PC
11, 11a, 11b control unit
12, 12a, 12b storage unit
13 image input unit
21, 21b determination gesture recognition unit
22, 21b operation gesture recognition unit
23, 23a device control unit (control signal generating means, transmitting means)
24 device selecting unit (control device specifying means)
25 face recognizing unit (user authenticating means)
31, 31b specific part information acquiring unit (gesture detecting means)
32 determination gesture assessment unit (first gesture detecting means, third gesture determining means)
33, 33b specific part information acquiring unit (gesture detecting means)
34 determination gesture assessment unit (second gesture detecting means, third gesture determining means)

The invention claimed is:

1. A gesture input device that controls a control device on the basis of a gesture action of a user, comprising:
    a gesture detecting unit that detects a gesture from an image picked up by a camera;
    a first gesture determining unit that determines that the gesture detected by the gesture detecting unit includes a first gesture;
    a second gesture determining unit that determines that the gesture detected by the gesture detecting unit includes a second gesture;
    a control signal generating unit that sets a period in which the first gesture determining unit determines that the gesture includes the first gesture as a second gesture valid period in which recognition of the second gesture is valid and generates a control signal on the basis of the second gesture when the second gesture determining unit determines that the gesture includes the second gesture in the second gesture valid period; and
    a transmitting unit that transmits the control signal generated by the control signal generating unit to the control device.

2. The gesture input device according to claim 1, wherein the control signal generating unit generates, with reference to a control signal table in which the second gesture is associated with a control signal to control the control device, the control signal.

3. The gesture input device according to claim 1, further comprising:
    a control device specifying unit that specifies the control device corresponding to a first gesture determined by the first gesture determining unit to be included in the gesture with reference to a device selecting table in which the first gesture and the control device are associated with each other,
    wherein the transmitting unit transmits the control signal to the control device specified by the control device specifying unit.

4. The gesture input device according to claim 1, further comprising:
    a third gesture determining unit that determines that the gesture detected by the gesture detecting unit includes a third gesture; and
    a control device specifying unit that specifies the control device corresponding to the third gesture determined by the third gesture determining unit to be included in the gesture with reference to the device selecting table in which the third gesture and the control device are associated with each other,
    wherein the transmitting unit transmits the control signal to the control device specified by the control device specifying unit.

5. The gesture input device according to claim 1, further comprising:
    a user authenticating unit that authenticates a user,
    wherein the gesture detecting unit detects a gesture of a user authenticated by the user authenticating unit.

6. The gesture input device according to claim 5, wherein the user authenticating unit authenticates a user on the basis of an image picked up by the camera.

7. A method of controlling a gesture input device that controls a control device on the basis of a gesture action of a user, comprising:
   a gesture detecting step of detecting a gesture from an image picked up by a camera;
   a first gesture determining step of determining that the gesture detected in the gesture detecting step includes a first gesture;
   a second gesture determining step of determining that the gesture detected in the gesture detecting step includes a second gesture;
   a control signal generating step of setting a period in which it is determined in the first gesture determining step that the gesture includes the first gesture as a second gesture valid period in which recognition of the second gesture is valid and generates a control signal on the basis of the second gesture when it is determined in the second gesture determining step that the gesture includes the second gesture in the second gesture valid period; and
   a transmitting step of transmitting the control signal to the control device.

8. The gesture input device according to claim 2, further comprising:
   a control device specifying unit that specifies the control device corresponding to a first gesture determined by the first gesture determining unit to be included in the gesture with reference to a device selecting table in which the first gesture and the control device are associated with each other,
   wherein the transmitting unit transmits the control signal to the control device specified by the control device specifying unit.

9. The gesture input device according to claim 2, further comprising:
   a third gesture determining unit that determines that the gesture detected by the gesture detecting unit includes a third gesture; and
   a control device specifying unit that specifies the control device corresponding to the third gesture determined by the third gesture determining unit to be included in the gesture with reference to the device selecting table in which the third gesture and the control device are associated with each other, wherein the transmitting unit transmits the control signal to the control device specified by the control device specifying unit.

10. The gesture input device according to claim 2, further comprising:
    a user authenticating unit that authenticates a user,
    wherein the gesture detecting unit detects a gesture of a user authenticated by the user authenticating unit.

11. The gesture input device according to claim 3, further comprising:
    a user authenticating unit that authenticates a user,
    wherein the gesture detecting unit detects a gesture of a user authenticated by the user authenticating unit.

12. The gesture input device according to claim 4, further comprising:
    a user authenticating unit that authenticates a user,
    wherein the gesture detecting unit detects a gesture of a user authenticated by the user authenticating unit.

13. The gesture input device according to claim 8, further comprising:
    a user authenticating unit that authenticates a user,
    wherein the gesture detecting unit detects a gesture of a user authenticated by the user authenticating unit.

14. The gesture input device according to claim 9, further comprising:
    a user authenticating unit that authenticates a user,
    wherein the gesture detecting unit detects a gesture of a user authenticated by the user authenticating unit.

15. The gesture input device according to claim 10, wherein the user authenticating unit authenticates a user on the basis of an image picked up by the camera.

16. The gesture input device according to claim 11, wherein the user authenticating unit authenticates a user on the basis of an image picked up by the camera.

17. The gesture input device according to claim 12, wherein the user authenticating unit authenticates a user on the basis of an image picked up by the camera.

18. The gesture input device according to claim 13, wherein the user authenticating unit authenticates a user on the basis of an image picked up by the camera.

19. The gesture input device according to claim 14, wherein the user authenticating unit authenticates a user on the basis of an image picked up by the camera.

20. A gesture input device that controls a control device on the basis of a gesture action of a user, comprising:
    a gesture detecting means that detects a gesture from an image picked up by a camera; a first gesture determining means that determines that the gesture detected by the gesture detecting means includes a first gesture;
    a second gesture determining means that determines that the gesture detected by the gesture detecting means includes a second gesture;
    a control signal generating means that sets a period in which the first gesture determining means determines that the gesture includes the first gesture as a second gesture valid period in which recognition of the second gesture is valid and generates a control signal on the basis of the second gesture when the second gesture determining means determines that the gesture includes the second gesture in the second gesture valid period; and
    a transmitting means that transmits the control signal generated by the control signal generating means to the control device.

* * * * *